(12) United States Patent
Raz et al.

(10) Patent No.: US 8,533,808 B2
(45) Date of Patent: Sep. 10, 2013

(54) NETWORK SECURITY SMART LOAD BALANCING USING A MULTIPLE PROCESSOR DEVICE

(75) Inventors: Ofer Raz, Ramat Gan (IL); Erez Geva, Petah Tikva (IL); Uri Goren, Rishon Le Zion (IL)

(73) Assignee: Check Point Software Technologies Ltd., Ramat Gan (IL)

( * ) Notice: Subject to any disclaimer, the term of this patent is extended or adjusted under 35 U.S.C. 154(b) by 868 days.

(21) Appl. No.: 11/693,032

(22) Filed: Mar. 29, 2007

(65) Prior Publication Data

US 2007/0180513 A1 Aug. 2, 2007

Related U.S. Application Data

(63) Continuation-in-part of application No. 11/345,341, filed on Feb. 2, 2006.

(51) Int. Cl.
G06F 9/00 (2006.01)
G06F 11/00 (2006.01)

(52) U.S. Cl.
USPC .................................. 726/12; 726/11; 726/23

(58) Field of Classification Search
USPC .................. 726/11–14, 22–24; 709/227–229
See application file for complete search history.

(56) References Cited

U.S. PATENT DOCUMENTS

| | | | |
|---|---|---|---|
| 6,374,300 B2 * | 4/2002 | Masters ......................... | 709/229 |
| 6,424,992 B2 * | 7/2002 | Devarakonda et al. ........ | 709/203 |
| 6,735,205 B1 * | 5/2004 | Mankude et al. ......... | 370/395.32 |
| 6,880,089 B1 | 4/2005 | Bommareddy | |
| 7,028,183 B2 | 4/2006 | Simon et al. | |
| 7,107,609 B2 | 9/2006 | Cheng | |
| 7,130,305 B2 | 10/2006 | Kuukankorpi | |
| 7,131,140 B1 * | 10/2006 | O'Rourke et al. ............... | 726/11 |
| 7,194,535 B2 | 3/2007 | Hannel | |
| 7,254,834 B2 | 8/2007 | Goddard | |
| 7,260,841 B2 | 8/2007 | Tenereillo | |
| 7,274,706 B1 | 9/2007 | Nguyen | |
| 7,280,540 B2 | 10/2007 | Halme | |
| 7,296,076 B1 * | 11/2007 | Portolani ....................... | 709/227 |
| 7,409,706 B1 * | 8/2008 | O'Rourke et al. ............... | 726/11 |
| 7,590,736 B2 | 9/2009 | Hydrie | |
| 7,860,975 B2 | 12/2010 | Elving | |
| 7,992,199 B1 * | 8/2011 | Winick et al. .................... | 726/11 |
| 2001/0052024 A1 * | 12/2001 | Devarakonda et al. ........ | 709/238 |
| 2002/0023159 A1 * | 2/2002 | Vange et al. .................... | 709/228 |
| 2002/0073337 A1 * | 6/2002 | Ioele et al. ..................... | 713/201 |
| 2002/0143954 A1 | 10/2002 | Aiken et al. | |
| 2002/0143955 A1 * | 10/2002 | Shimada et al. .............. | 709/227 |
| 2003/0014628 A1 * | 1/2003 | Freed et al. .................... | 713/155 |
| 2003/0018914 A1 * | 1/2003 | Cheng et al. ................... | 713/201 |
| 2003/0019170 A1 | 1/2003 | Donnelly | |
| 2003/0187871 A1 * | 10/2003 | Amano et al. ................. | 707/102 |

(Continued)

*Primary Examiner* — Darren B Schwartz
(74) *Attorney, Agent, or Firm* — Mark M. Friedman

(57) ABSTRACT

A method for protecting data communications using a multiple processor device in which multiple processors are operatively connected by a transport mechanism for sharing data. One or more of the processors is programmed as a dispatcher and other processors are programmed with processes. Each of the processes enforce an identical security policy and/or perform an identical or specialized security function. Data streams are transferred respectively from the dispatcher to the processes through the transport mechanism. Control information is transmitted through the transport mechanism from one or more processes to the dispatcher. The control information specifies balancing load of the data streams between the processes. The dispatcher balances load based on the control information.

16 Claims, 10 Drawing Sheets

(56) References Cited

U.S. PATENT DOCUMENTS

| | | | |
|---|---|---|---|
| 2004/0003099 A1* | 1/2004 | House et al. | 709/229 |
| 2004/0024880 A1* | 2/2004 | Elving et al. | 709/227 |
| 2004/0218611 A1* | 11/2004 | Kim | 370/401 |
| 2004/0267920 A1* | 12/2004 | Hydrie et al. | 709/223 |
| 2005/0002406 A1* | 1/2005 | Miyata et al. | 370/401 |
| 2005/0038905 A1* | 2/2005 | Banes et al. | 709/238 |
| 2005/0044351 A1 | 2/2005 | Harvey | |
| 2005/0183140 A1 | 8/2005 | Goddard | |
| 2006/0080446 A1* | 4/2006 | Bahl | 709/227 |
| 2006/0277596 A1* | 12/2006 | Calvert et al. | 726/3 |

\* cited by examiner

Complex Connection

SLB protocol

NETWORK SECURITY SMART LOAD BALANCING USING A MULTIPLE PROCESSOR DEVICE

CROSS REFERENCE TO RELATED APPLICATIONS

The present application is a continuation-in-part of and benefits from application Ser. No. 11/345,341 filed Feb. 2, 2006 incorporated herein by reference.

FIELD AND BACKGROUND OF THE INVENTION

The present invention relates to security of data networks and specifically to a system and method for providing a high-speed firewall which protects networks while processing complex connections.

Firewall techniques involve using a set of rules to compare incoming data packets to a defined security policy. A firewall accepts and denies traffic between two or more network domains. In many cases, there are three domains where the first domain is an internal network such as in a corporate organization. Outside the internal network is a second network domain where both the internal network and the outside world have access, sometimes known as a "demilitarized zone" or DMZ. The third domain is the external network of the outside world.

A firewall regulates the flow of data packets. A packet includes a header and a payload. The header includes header information (i.e. header parameters), which typically includes a source and destination address, and source and destination port numbers, and a protocol. The payload includes data conveyed by the packet from its source to its intended destination. The firewall, which is situated between the source and destination, intercepts the packet. The firewall filters packets based upon header information and a rule previously loaded into the firewall. The rule correlates a pattern in the header of a packet with a prescribed action, either PASS or DROP or other actions like encrypt, perform network address translation (NAT) send a RESET packet, generate logs, and perform content inspection on the packet data. The filter identifies the rule that applies to the packet based upon the packet's header, and then implements the rule's prescribed action. When a DROP action is performed, the packet is blocked (deleted), and does not reach its intended destination. When a PASS action is performed, the packet is passed on toward its intended destination. The set of rules loaded into a firewall reflect a security policy, which prescribes what type of information is permissible to pass through the firewall, e.g., from which source, to which destination, and for which application.

To ensure sufficient capacity of a firewall, it is common to construct clusters which include typically a number of firewall nodes sharing a common network address, and connections are typically directed to the cluster by means of a cluster network address. Additionally, the nodes typically have node-specific addresses, e.g. MAC addresses. In a cluster, if the firewall nodes have a common cluster network address, all the firewall nodes read all data packets arriving at the cluster. Consequently, there has to be an arrangement for distinguishing which data packets belong to which node. Each node should process only those packets that are assigned to it and not receive or receive but ignore other data packets.

Connections directed to a cluster of network elements are directed to different nodes of the cluster on the basis of predefined distribution criteria. Frequently, distributing is done so that each firewall node filters all arriving data packets and decides on the basis of the header field(s) of the packet whether that particular node needs to process that particular packet. Frequently, specific sets of hash values are allocated to the nodes and a hash value for a data packet is calculated using a predetermined hash function and certain header fields of the data packet. Typically the header fields that are used for calculating hash values for TCP/IP (Transfer Control Protocol/Internet Protocol) or for UDP/IP (User Datagram Protocol/Internet Protocol) are source address, source port, destination address and destination port. When a data packet directed to the cluster network address arrives at the cluster, a hash value is calculated on the basis of some header fields of the data packet, and the resulting hash value defines which node processes the data packet. Typically, all nodes filter all arriving data packets by calculating hash values for them, and then decide on the basis of the hash values regarding which packets which belong to each node. Methods other than calculating a hash from the header connection information may be used for distributing the data packets.

Several prior art techniques are used to determine distribution of packets among the firewall nodes. Often, a return to sender (RTS) technique is used in which for each connection the load balancer learns the MAC address of the firewall node so that replies from servers are directed to the correct firewall. Sometimes the load between the firewall nodes is balanced statically without any dynamic adjustment of load between the firewall nodes. and/or a new connection is assigned according to a "round robin" technique distributing each new connection to the next firewall node in a queue without regard to the actual availability of the node. A simple query, such as a "ping" may be used and the time to respond to the "ping" is measured to roughly assess the availability of the firewall node.

According to U.S. Pat. No. 6,880,089, a firewall clustering system connects two or more firewalls between an internal network and an external network. Firewalls maintain client-server state information. Flow controllers are connected to the firewalls and placed on both the internal "trusted" side and the external "untrusted" side of the firewalls. Flow controllers are placed on both sides of the firewalls to ensure that traffic for a given client-server connection flows through the same firewall in both inbound and outbound directions. The firewalls perform filtering operations and/or network address translation (NAT) services.

According to a method disclosed in US patent application publication 20030002494, node-specific lists of connections are maintained which specify for which connections each node of a firewall is responsible. A data packet, which initiates opening of a new connection, is processed in a node determined by a distribution decision according to predetermined distribution criteria. The first data packets are thus distributed to the cluster nodes. A data packet, which relates to an opened packet data connection, is processed in that node in whose connection list the opened packet data connection is specified. Changing the distribution criteria is required when load is not in balance between the nodes, or when a new node is added or removed to/from the cluster.

The prior art addresses load balancing between firewall nodes for "simple connections". An important requirement from a load balancing device is to maintain connection stickiness, so that all packets belonging to the same connection will be forwarded to same firewall. Standard load balancers available on the market today can provide connection stickiness for simple connection types. However, for complex connections, such as when control and data are on different connections, e.g. FTP or voice over IP connections when NAT is applied, the NAT information is inserted into the payload, the prior art method load balancing systems and methods are not appropriate, and different firewalls may be processing different packets of the same complex connection.

There is thus a need for, and it would be highly advantageous to have a system and method in which one or more firewalls of a firewall cluster manages the load balancer specifically by inspecting the content, i.e. payload, of packets of a complex connection, and directs a switch regarding expected connections related to the complex connection.

SUMMARY OF THE INVENTION

The term "blade and the term "node" are used herein interchangeably. The terms "firewall" and "firewall node" are used herein interchangeably. The firewall is a computer running firewall software, hardware and/or firmware. An example of firewall software is Check Point VPN-1 Power or VPN-1 UTM or VPN-1 VSX, or other. (Check Point Software Technologies Ltd., 3A Jabotinsky St., Ramat Gan, ISRAEL). The term "firewall cluster" is used to denote a cluster of firewalls. The term "security network component" as used herein is a network component, such as a firewall or server, which performs a security function. The term "security function" is used herein includes inspection, NAT, encryption, filtering, intrusion detection and prevention, threat management, anti-spam, and anti-virus. The term "switch" denotes a load balancing switching device. The term "switch" and the term "load balancer" are used herein interchangeably. The term "firewall identifier" is a unique number identifying the specific firewall. A firewall is identified by the physical port number it is connected to and/or a MAC address. The firewall identifier may be related to or corresponding to, such as with a look up table, to MAC address, or switch port number.

In the context of the present invention the term "security network component" may include a multiple processor device in which multiple processes in the multiple processor device perform independent security functions. In different embodiments of the present invention, the multiple processor device may be a multi-core device with multiple processors on the same die, and in other embodiments of the present invention the multiple processor device is a multi-chip device with multiple chips in the same integrated circuit package or multiple processors packaged separately on one or more printed circuit boards but operating in the same computer housing. The multi-chip device includes one or more processing units (e.g. RISC, ASIC, general purpose processor) on the same die.

The term "stickiness" or "persistence" as used herein is used to denote the property that all packets of the same session or related connections are processed by the same security network component or the same process performing a security function when more than one process is available such as in a multiple processor device in the security network component. The terms "complex connection" and "session" are used herein interchangeably.

The term "mechanism" or "transport mechanism" for sharing data between multiple processors includes shared memory, cache memory, a shared registers, a shared interface, or other messaging mechanism for transferring data between the processors. The term "process" is used herein refers to a software process of any kind which runs for example in a kernel or an application layer. The term "process" and "application" are used herein interchangeably.

According to the present invention there is provided a method for protecting data communications using a multiple processor device in which multiple processors are connected preferably by a transport mechanism for sharing data. One or more of the processors are programmed as a dispatcher and other processors are programmed with processes. Each of the processes enforces an identical security policy and may be symmetric or asymmetric with regards to functional processing. Data streams are transferred respectively from the dispatcher to the processes through the shared memory. Control information is transmitted through the transport mechanism from one or more processes to the dispatcher. The control information specifies balancing load of the data streams between the processes. The dispatcher balances load based on the control information. Typically, a process performs network address translation and the control information specifies an expected connection based on the network address translation, or a process performs encryption. the control information specifying an expected connection based on the encryption. The data communications preferably include an encrypted session. The encrypted connection is identified based on the control information, and the balancing of load maintains stickiness of the encrypted connection.

The control information preferably specifies one of the processes to receive a new connection. A packet is received by the process through the dispatcher and the packet is of a connection of a communications session. The process reads a datum from the packet and the control information based on the datum specifying at least one expected connection is transferred to the dispatcher. Upon reading the datum, the communications session is encrypted by the process and the encrypted data stream is identified by the dispatcher based on the control information. The expected connection includes an expected packet of the session and the datum is preferably in a payload of the packet. Upon receiving an expected packet of the expected connection, the expected packet is forwarded based on the control information. The control information specifies an expected client-to-server connection and an expected server-to-client connection, in which at least one of the following conditions is fulfilled:

(i) at least one source parameter of said client-to-server connection differs from at least one destination parameter of said server-to-client connection; and (ii) at least one destination parameter of said client-to-server connection differs from at least one source parameter of said server-to-client connection.

According to the present invention there provided a computer readable medium tangibly embodying instructions to program the multiple processor device to perform the method as disclosed herein.

According to the present invention there is provided a multiple processor device including multiple processors operatively connected by a transport mechanism for sharing data. One or more of the processors is programmed as a dispatcher and other processors are programmed with processes. Each of the processes enforces an identical security policy and/or performs an identical or specialized security function. The dispatcher transfers multiple data streams respectively to the processes through the transport mechanism. Control information is transmitted through the transport mechanism from one or more processes to the dispatcher. The control information specifies balancing load of the data streams between the processes; and the dispatcher balances load based on the control information.

According to the present invention there is provided a system for protecting data communications including a cluster of security network components; and a load balancer which connects the security network components by transferring data streams respectively to the security network components. The load balancer receives a command from the security network components. The command specifies balancing network component load of the data streams between the security network components. The security network component includes a multiple processor device with multiple processors operatively connected by a transport mechanism for sharing data. One or more of the processors is programmed as a dispatcher and other processors are programmed with processes. Each of the processes enforces an identical security policy and/or performs an identical or specialized security function. The dispatcher transfers data streams respectively to the processes through the transport mechanism. Control information is transmitted through the transport mechanism from at least one of the processes to the dispatcher. The control information specifies balancing process load of the data streams between the processes. The dispatcher balances the process load based on the control information, The command is preferably transmitted from to the load balancer, from either the dispatcher or one of the processes. The command preferably includes the control information based on the data received by the dispatcher from one or more processes. When the load balancer includes a pre-filter module, the pre-filter module addresses a packet to a single process based on the command or to a destination in the network.

The data communications preferably include multiple sessions, and connection information is included as arguments of control commands of the load balancer so that (i) said network components read the connection information; and (ii) commands from the security network components to the load balancer allow maintaining connection stickiness in the session wherein connection stickiness guarantees that all packets of each of the sessions are processed by a single process.

According to the present invention there is provided a method for protecting data communications using a multiple processor device including multiple processors connected within the device preferably with a mechanism for sharing data. The processors are each programmed with security applications. Data streams are transferred respectively to the security applications. Control information, which specifies distribution of load of the data streams between the security applications, is transmitted from the security applications and the load is distributed based on the control information. Typically two or more of the applications are programmed in each processor to perform different security functions including inspection, network address translation, encryption, filtering, intrusion detection, intrusion prevention, threat management, anti-spam, and/or anti-virus.

According to the present invention there is provided a multiple-processor device including multiple processors connected preferably with a mechanism for sharing data. The processors are respectively programmed with multiple, typically different, security applications. Multiple data streams are respectively transferred to the security applications. Control information is transmitted from one or more security applications, wherein which specifies distribution of load of the data streams between the security applications; and the load is distributed based on the control information.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
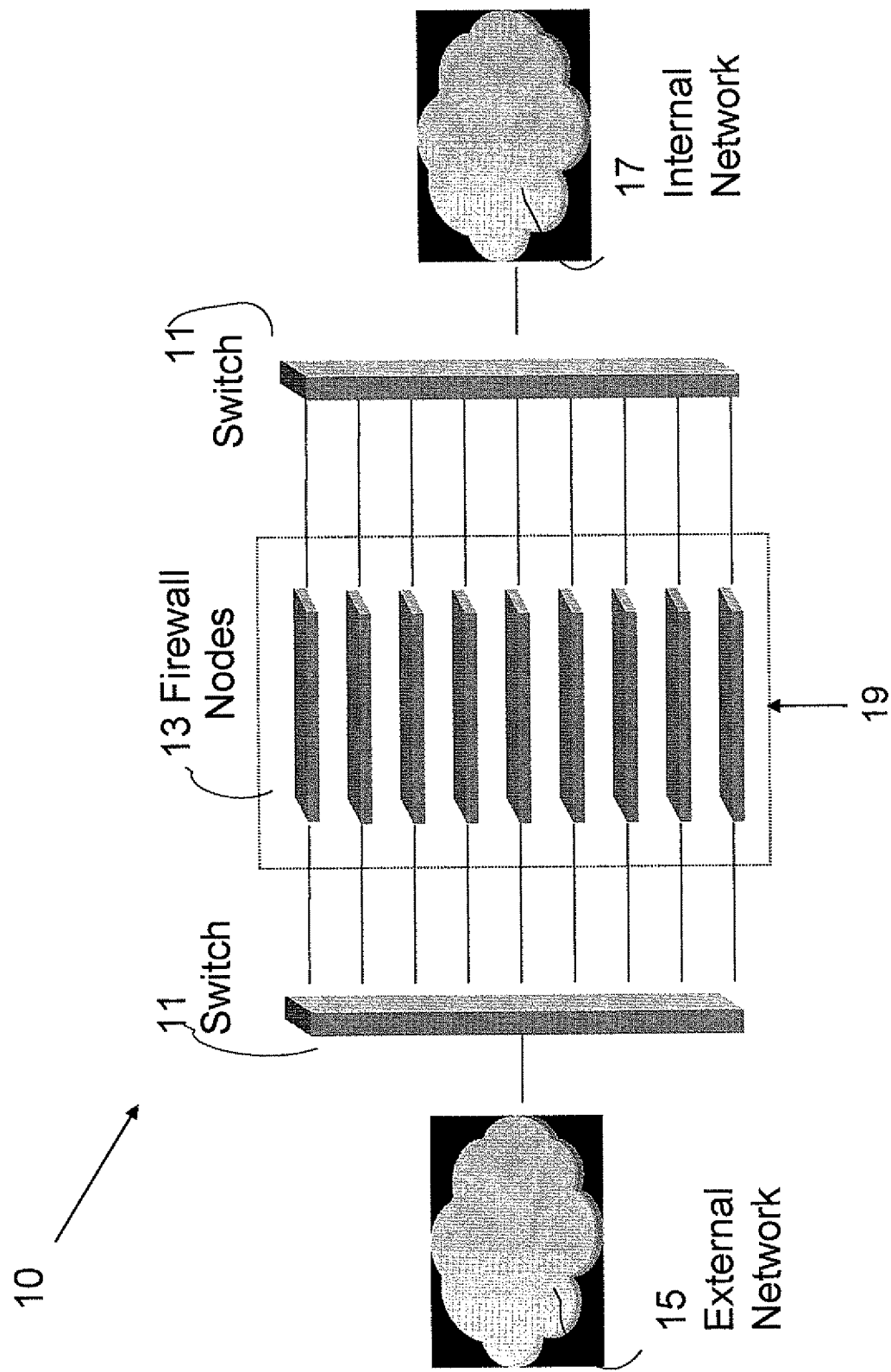
FIG. 1 is a drawing of a cluster of firewall nodes at a gateway between two networks, a system which may be used for the method of the present invention

The present invention is of a system and method for smart load balancing of a cluster of firewall nodes. Typically it is advantageous that in a cluster of firewall nodes, a single firewall node processes all the packets of a connection. For simple connections, it is typically sufficient to read header information of packets to insure that the same firewall node handles all the packets of the simple connection. However, for complex connections or sessions, often control information specifying upcoming connections is transferred as arguments of control commands, i.e., in the payloads of the packets of the control command. The present invention utilizes the control information to maintain connection stickiness by transferring information using a special protocol to a switch connecting the firewall nodes. The switch subsequently transfers new connections to the appropriate firewall node.

The principles and operation of a system and method of smart load balancing (SLB), according to the present invention, may be better understood with reference to the drawings and the accompanying description.

It should be noted, that although the discussion herein relates to load balancing between firewall nodes in a cluster, the present invention may, by non-limiting example, alternatively be configured as well using load balancing in a cluster of other network components such as in a cluster of servers. A difference between load balancing in a firewall cluster and load balancing in a gateway with a cluster of servers is that the server is typically identified by a unique IP address while in firewall nodes a connection, e.g. packet, does not include an identifier specifying which firewall node will handle the connection.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions. Specifically, programming such as programming of the dispatcher and firewall processes of the present invention may be implemented equivalently in hardware or software.

The embodiments of the present invention may comprise a general-purpose or special-purpose computer system including various computer hardware components, which are discussed in greater detail below. Embodiments within the scope of the present invention also include computer-readable media for carrying or having computer-executable instructions, computer-readable instructions, or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as any architecture where two or more computer systems may exchange data. Exchanged data may be in the form of electrical signals that are meaningful to the two or more computer systems. When data is transferred or provided over a network or another communications connection (either hardwired, wireless, or a combination of hardwired or wireless) to a computer system or computer device, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions.

In this description and in the following claims, a "computer system" is defined as one or more software modules, one or more hardware modules, or combinations thereof, which work together to perform operations on electronic data. For example, the definition of computer system includes the hardware components of a personal computer, as well as software modules, such as the operating system of the personal computer. The physical layout of the modules is not important. A computer system may include one or more computers coupled via a computer network. Likewise, a computer system may include a single physical device (such as a mobile phone or Personal Digital Assistant "PDA") where internal modules (such as a memory and processor) work together to perform operations on electronic data.

Those skilled in the art will appreciate that the invention may be practiced in network computing environments with many types of computer system configurations, including mobile telephones, PDA's, pagers, hand-held devices, laptop computers, personal computers, multi-processor systems, microprocessor-based or programmable consumer electronics, network PCs, minicomputers, mainframe computers, and the like. The invention may also be practiced in distributed computing environments where local and remote computer systems, which are linked (either by hardwired links, wireless links, or by a combination of hardwired or wireless links) through a communication network, both perform tasks. In a distributed computing environment, program modules may be located in both local and remote memory storage devices.

By way of introduction, principal intentions of the present invention are to: provide high speed (~10 Gbs) load balancing through a cluster of firewall nodes and maintain "stickiness", i.e. to process all packets of the same connection using the same firewall node, even for control and data packets of the same complex connection. An intention of the present invention is to guarantee data locality of a session data-set, so, each processing process (or node) maintains one copy of the dataset and can control (read or write) the dataset safely without the need to synchronize related transaction with other processes or nodes. Such an architecture which is manifested on multiple nodes and/or multiple processors share the same memory and/or distributed memory architecture (NUMA).

Referring now to the drawings, FIG. 1 illustrates a system 10 used according to an embodiment of the present invention. System 10 or SLB device 10 is a symmetric configuration of two switches 11 which switch data traffic at a gateway between an internal network 17 and an external network 15. Switches 11 are configured to decide which firewall node 13 is used of firewall cluster 19 to process data and control packets traveling between internal network 17 and external network 15. Alternatively, in a different configuration a single switch 11 may be used with firewall cluster 19. Both switches 11 and firewall nodes 13 are computers or computing machines each including a processor and memory and appropriate interfaces (not shown). Different embodiments of the present invention include a number of hardware configurations including multiple processors on a single circuit board, or alternatively multiple boards (or blades) each including a single processor or alternatively different nodes connected via a network. A basic requirement from switch 11 is to perform load-balancing between the firewalls 13 with stickiness. Switch 11 may employ known algorithms for load balancing e.g. Round-Robin, Server-Load, Hash.

In another embodiment of the present invention a single switch 11 is connected respectively through different ports to external network, e.g. Internet, 15 and to LAN 17. Firewall 13 needs to send control commands to switch 11 including a description of the connections both on the Internet side and on the LAN side.

Figure 2:
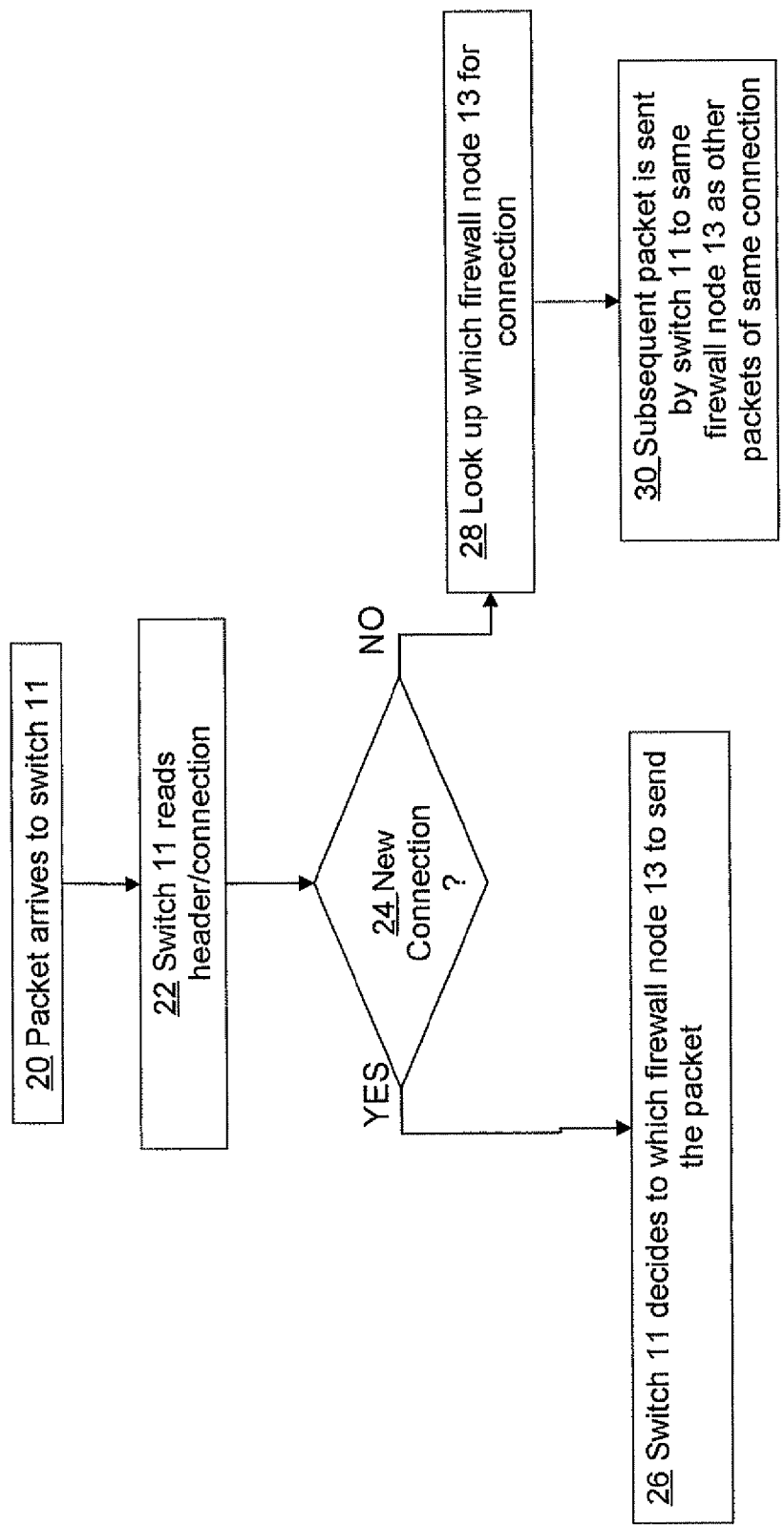
FIG. 2 is a prior art flow drawing of the prior art for processing simple connections.

Reference is now made also to FIG. 2 which shows a prior art method for balancing load of simple connections through system 10. A packet of a simple connection arrives (step 20) at switch 11. Typically, switch 11 reads (step 22) the header of the packet and checks to determine if the received packet is of an existing connection or a new connection (decision block 24). If the received packet is a first packet of a new connection then switch 11 decides (step 26) to which firewall node 13 to send the received packet based on a previously defined rule stored in memory. Otherwise, if the received packet is not a first packet but a packet of an existing connection, then switch 11 look up (step 28) the connection and switches (step 30) the packet to the correct firewall node 13, typically with the same firewall node 13 processing all the packets of the same connection.

Figure 3:
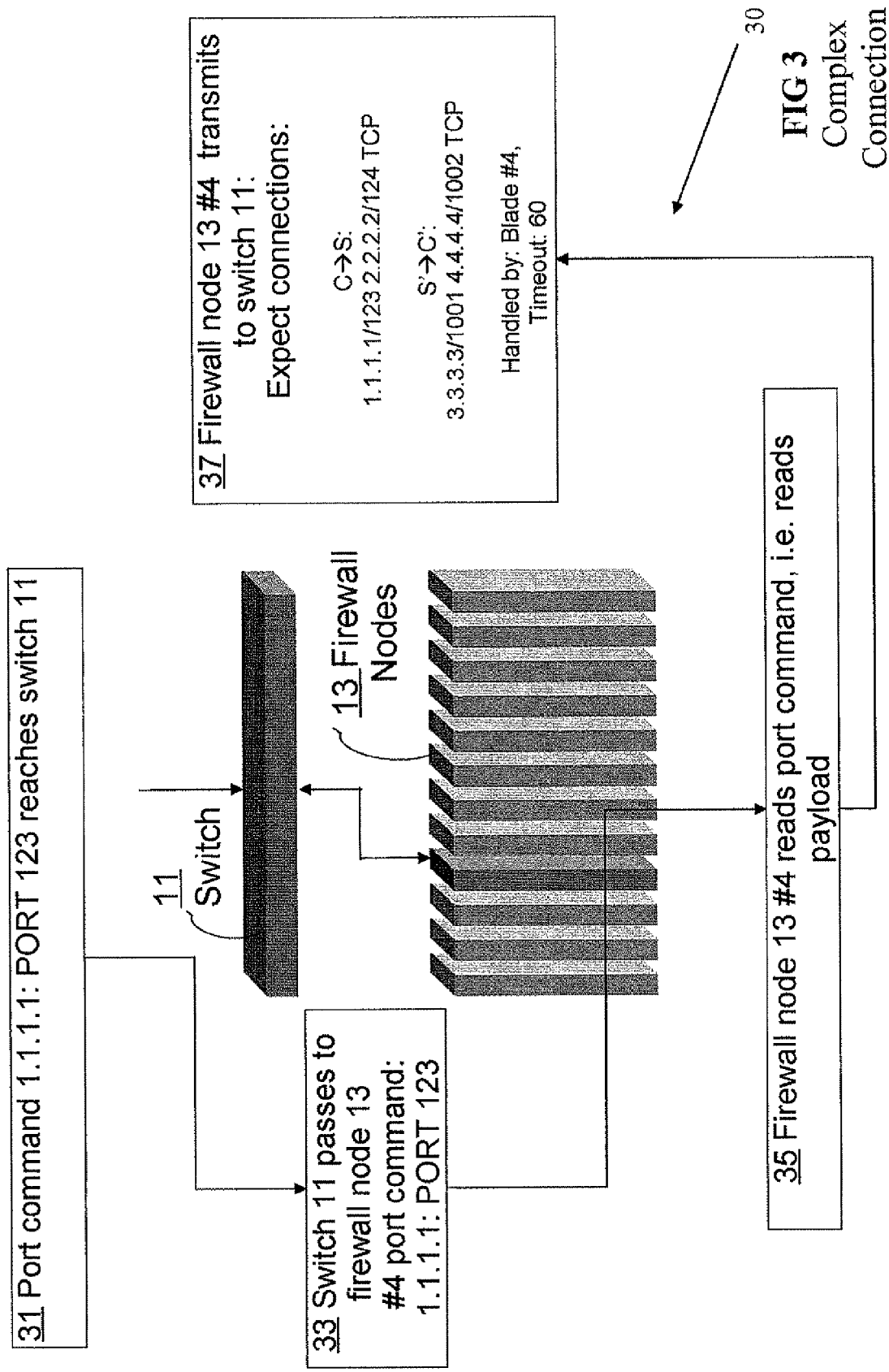
FIG. 3 is a flow drawing of the present invention for processing complex connection.

Reference is now made to FIG. 3, a flow diagram of a processing method for complex connections or sessions, according to an embodiment of the present invention. In the example of FIG. 3, a control connection of a complex connection is established in the same manner as a simple connection. The example of FIG. 3 uses an FTP port command, however the present invention is applicable to any complex connection which include control and data connections in which information regarding the data connection is included in an argument of the control connection. The present invention is further applicable to a session involving multiple control connections which are related to each other. An FTP PORT command reaches (step 31) switch 11. An FTP port command is a control command which includes as an argument of the command a client port to be used in a passive data connection associated with the FTP port command. In the example of FIG. 3, the port command 1.1.1.1 PORT 123 comes from a client of IP address 1.1.1.1 and requests data using client port 123. The port command is passed (step 33) by switch 11 to a firewall node 13, e.g. #4. Firewall node 13 reads (step 35) the port command, included in the payload(s) of the packet(s). Based on the information read in the payload of the packet(s) carrying the PORT command, firewall node 13 transmits (step 37) a control command to switch 11 to expect connections as defined from the arguments of the PORT command. In the example of FIG. 3, network address translation is being used so two connections are expected related to the FTP connection, where C denotes client and S denotes server. The expected connections are typically specified by source IP address/source port and protocol, e.g. TCP. Because of network address translation, the IP address of client C is 1.1.1.1 and the translated IP address C' is different e.g. 4.4.4.4. Similarly, the public IP address of server S is 2.2.2.2 and the translated address S' is 3.3.3.3. Firewall 13 typically transmits along with the control command for the expected connections a firewall node, e.g. #4 handle the connections as well as a timeout parameter, e.g. 60 which causes the connection to expire 60 seconds after last packet is received, as follows:

C→S:

1.1.1.1/123 2.2.2.2/124 TCP

S'→C':

3.3.3.3/1001 4.4.4.4/1002 TCP

Handled by: Firewall node #4, Timeout: 60

When an expected data connection is opened, switch 11 already expects the data connection, switch 11 performs the necessary network address translation and forwards the packets to the correct cluster member, e.g. firewall node 13 #4. Subsequent packets of the same session are matched to one of the keys of this connection and therefore directed to the same cluster member, firewall node 13 #4. In an alternative embodiment, firewall nodes 13 perform the network address translation (NAT) and in this case commands sent from firewall node 13 to switch 11 do not necessarily include NAT information.

In other embodiments of the present invention, one or more additional switches between firewall cluster 19 and the server may receive commands from firewall nodes 13. Optionally, there may be more than one firewall clusters 19 physically separated and cooperating with each other using multiple switches 11.

In certain protocols, especially voice over IP protocols, a session includes both control and data connections. Firewall node 13 typically opens a data connection and based on data found, e.g. in a payload of a packet of a control connection, firewall node 13 performs a specific action.

According to an embodiment of the present invention, smart load balancing of firewall nodes 13 may be generalized to include other network components 13 such as a cluster of servers 13. Servers 13 that are balanced may also be configured to decide which future simple connections should be directed to each server 13 as part of a complex connection or session. The decision of each server 13 is sent back to a switch 11 connecting servers 13 using a special protocol, even the same protocol as is used for smart load balancing of firewall nodes 13. The decision at the server can be performed in an application running on the server if the application has access to information regarding future connections. An alternative system, according to an embodiment of the present invention includes in server 13 a packet inspecting module which reads contents of the packets, decides which future connections will be sent to the server 13 and communicates the decision to switch 11.

According to other embodiments the present invention supports static and dynamic encryption protocols, e.g. VPN. In the static case, a centralized management installs information about encryption domains in security components 13 and security components 13 communicate information to load-balancer 11 regarding the partition of encrypted connections between security components 13. In the dynamic case, a routing protocol is used between security components 13 (and also with other external routers or VPN gateways) to decide which component 13 will handle which encrypted connections. Once the decision is made, and information regarding the partition of encrypted connections is known, security network components 13 transmit control information regarding the balancing of load to load-balancer 11.

Another option is that the load-balancer 11 allows one security network component 13 to establish a tunnel (e.g. Phase1 and Phase2 of IPSEC VPN) and once a tunnel is established load-balancer 11 receives an instruction from security network component 13 how to identify packets that relate to to that tunnel. Afterwards, all packets from the same VPN tunnel are directed to the same security network component 13. (e.g. using Security Parameters Index, SPI, that appears in the AH header of IPSEC packet.)

Smart Loading Balancing Protocol

Figure 4:
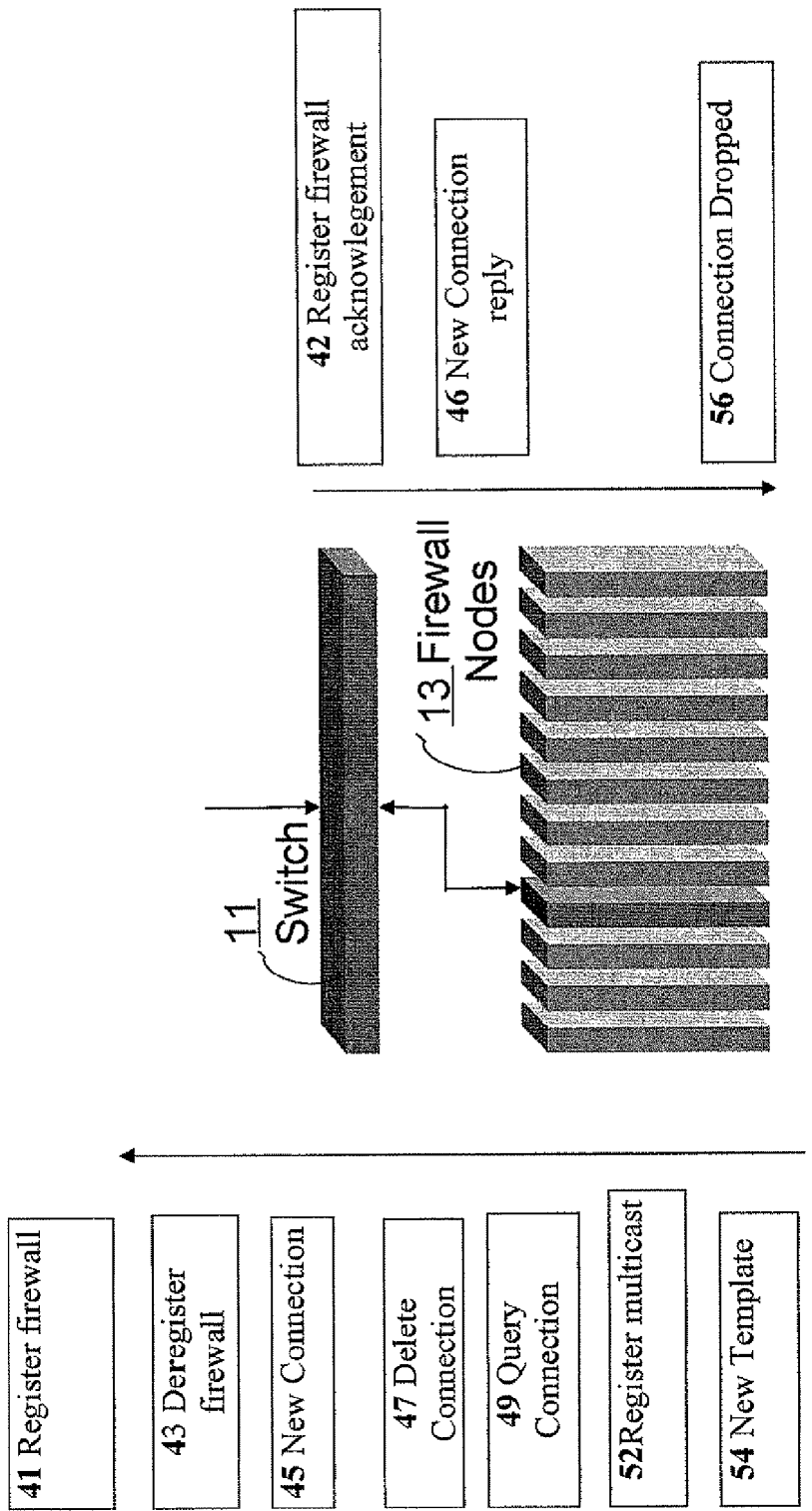
FIG. 4 is a drawing illustrating commands used in an example of a protocol of the present invention.

Reference is now made to FIG. 4 illustrating an example of a smart load balancing protocol which allows firewall nodes 13 to implement the process 30 and to override the default decision made by switch 11. Switch 11 receives commands from the firewalls 13: Typically, all firewalls 13 have the same priority, all commands are asynchronous, some commands may require switch 11 to send a reply, and the protocol is UDP based.

Commands Description

41 Register Firewall:

A register firewall command 41 initializes the connection between a firewall 13 and switch 11. When firewall 13 goes on line, switch 11 is notified so load balancing may begin. A parameter of the register firewall command 41 is the firewall identifier. Switch 11 replies with an acknowledgment 42, e.g. ACK. After receiving the register firewall command 41, switch 11 will begin forwarding traffic to firewall 13 according to the current load balancing algorithm.

43 Deregister Firewall:

The deregister firewall command 43 directs the SLB device 10 to ignore a firewall 13. Some of firewall nodes 13 may need to go off-line for maintenance. Additionally, an administrator may choose to use some of the machines for other purposes. A parameter of the deregister firewall command 43 is the firewall identifier. After firewall 13 sends a deregister firewall command to switch 11, existing connections will be forwarded to firewall 13 but new connections will be directed to other firewalls 13. If a firewall 13 stops responding i.e. crashes, switch 13 is expected to forward existing connections from firewall 13 to other firewalls 13.

45 New Connection:

The new connection command 45 instructs switch 11 to direct a connection to a specific firewall 13. In order to maintain stickiness for complex connections, a firewall 13 can send a new connection command to switch 11. Since network address translation (NAT) typically performed by switch 11 may cause both directions to look different, the command contains two expected connections switch 11 should handle.

The new connection command typically includes up to four parameters as follows:
1. Client to Server connection: Source IP, Source Port, Destination IP, Destination Port, Protocol
2. Server to Client connection: Source IP, Source Port, Destination IP, Destination Port, Protocol
3. Expiration time in seconds
4. Firewall Identifier Switch 11 may reply with a new connection reply 46 with a connection identifier and a firewall identifier.

After receiving the New-connection command, switch 11 directs packets that belong to this connection to firewall node 13 corresponding to the firewall identifier (parameter 4), start the expiration timer (e.g. each packet resets this timer), and if such a connection is already assigned to a firewall 13, switch 11 notifies the requesting firewall 13 about which firewall 13 is the current handler.

47 Delete Connection:

The Delete-connection command 47 is sent by a firewall when a connection is terminated. A parameter of the Delete-connection command is a connection identifier. Upon receiving such a command, switch 11 should immediately stop forwarding packets of the connection to relevant firewall 13. Packets from this connection, if any, should be treated as a new connection by switch 11.

49 Query Connection

The Query-connection command 49 is sent by firewall 13 to get information about a connection. A parameter is the connection identifier. The switch replies with connection information as follows:
1. Client to Server connection: Source IP, Source Port, Destination IP, Destination Port, Protocol
2. Server to Client connection: Source IP, Source Port, Destination IP, Destination Port, Protocol
3. Expiration time in seconds
4. Firewall Identifier

52 Register Multicast:

The register multicast command directs SLB device 10 to register a multicast connection. The parameters include a firewall identifier, multicast address and a port For some kinds of multicast connections, e.g Dynamic routing daemon, only one firewall 13 can handle the connection A Register-Multicast command should direct a multicast packet to a specific firewall 13.

54 New Template:

In some cases, many connections are opened between the same client and server.

In order to save many similar new-connection commands, a New-Template command will be issued.

Each connection that matches the template results in a new connection similar to a connection created by a new-connection command. Parameters of the new template command include:
1. Firewall Identifier
2. Client to Server connection: Source IP, Destination IP, Destination port, Protocol
3. Server to Client connection: Source IP, Source port, Destination IP, Protocol
4. Template Expiration time.
5. Connection Expiration time (reset on each packet).

56 Connection Dropped

A connection dropped command is sent by switch 11 to firewall 13 when a connection is dropped because switch 11 is at maximum capacity and can not handle the connection. A parameter of the Connection-dropped command is the connection identifier. Since switch 11 is the front end for SLB device 10, switch 11 is exposed to denial-of-service attacks.

When switch 11 is at maximum capacity, it should drop connections according to some kind of throttling algorithm, such as LRU (least recently used). In such scenarios, switch 11 is expected to notify the specific firewall 13 about the dropped connections.

57 Heartbeat

A Heartbeat command is sent by firewall 13 to switch 11 so that switch 11 can identify cases when firewall 13 is down. A parameter of the Heartbeat command is the firewall identifier.

Prefiltering Module

U.S. Pat. No. 6,496,935 discloses accelerating packet filtering by supplementing a firewall with a pre-filtering module. The pre-filtering module performs a limited set of actions with regard to the packets, according to whether the packets are received from a connection which has been previously permitted by firewall 13. If the packets are received from such a permitted connection, then the pre-filtering module forwards the packets directly to their destination in a network, optionally performing one or more actions on the packets. Otherwise, the packets are forwarded to firewall 13 for handling. Once firewall 13 has transferred responsibility for the connection to the pre-filtering module, or "off-loaded" the connection, firewall 13 does not receive further packets from this connection until a timeout occurs for the connection, or a packet is received with particular session-control field values, such that the connection is closed. The pre-filtering module is implemented as hardware, (and marketed by Check Point as an architecture called SecureXL or as software, marketed by Check Point as Performance Pack. U.S. Pat. No. 6,496,935 is included herein by reference for all purposes is if entirely set forth herein. The prefiltering module may be integrated in different configurations in different embodiments of the present invention. In one such configuration, prefiltering is integrated as software in switch 11, or a hardware attached between external network 15 and switch 11.

Smart Load Balancing in Multiple Processor Devices

Figure 5:
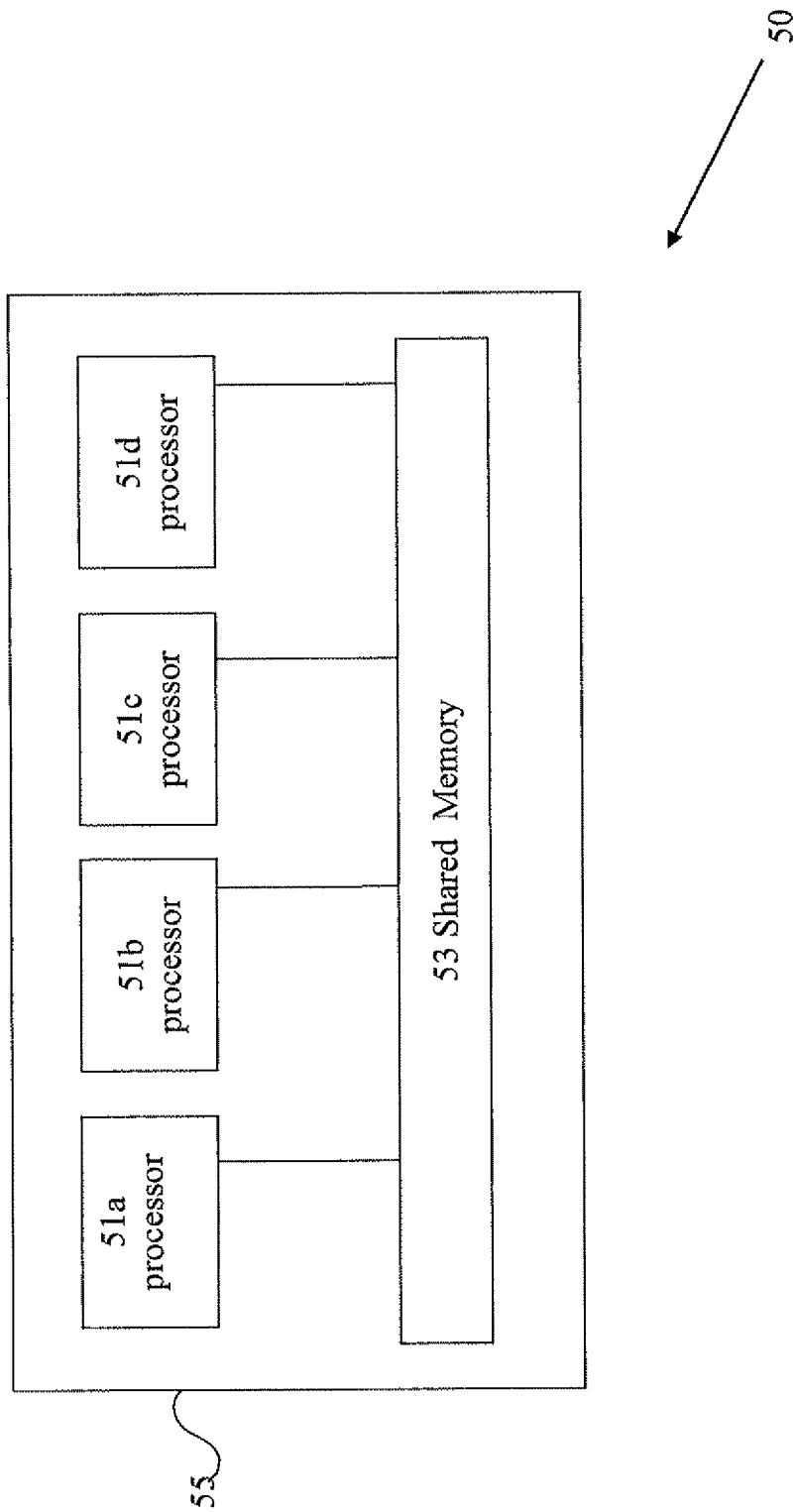
FIG. 5 is a simplified schematic drawing of a multiple processor device of the prior art.

A multiple processor device combines two or more independent processors into a single package, often a single integrated circuit (IC) or a multi-chip package. A dual-processor device contains two independent microprocessors. In general, multiple processor devices allow a computing device to exhibit thread-level parallelism (TLP) or chip-level multiprocessing. Reference is now made FIG. 5, which is a simplified illustration of a prior art architecture 50 of a multiple processor device 60 optionally constructed in a single package 55, e.g. on a single silicon die. Architecture 50 includes four processors 51a, 51b, 51c and 51d. Each processor 51 is attached to a memory shared between processors 51a-d.

Architecture 50 is by way of example only and the present invention in different configurations may use other multiple processor architectures.

Figure 6:
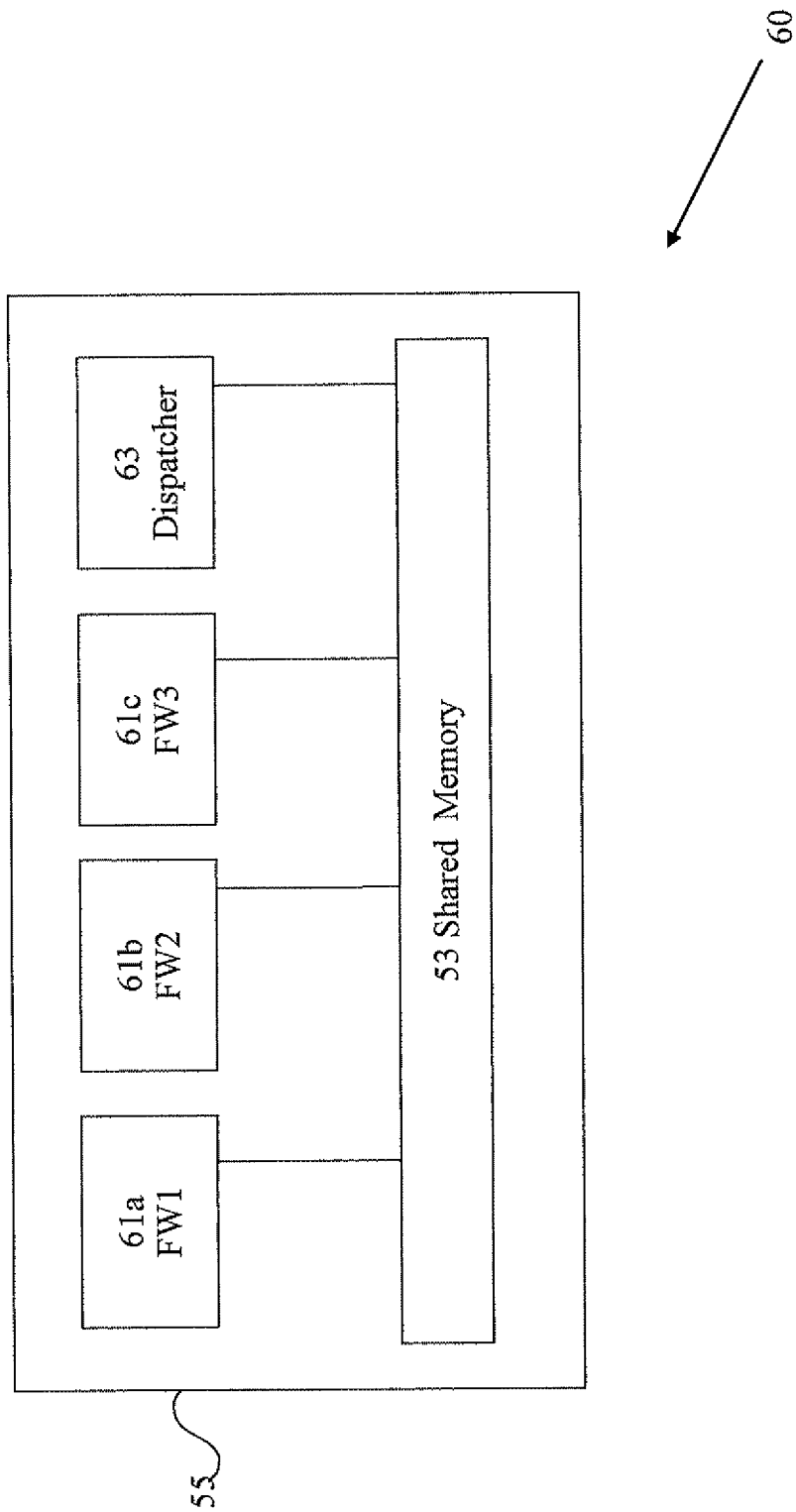
FIG. 6 is a simplified schematic drawing of a multiple processor device programmed according to an embodiment of the present invention.

Reference is now made to FIG. 6 which illustrates a multiple processor device 60 configured to perform load balancing, according to an embodiment of the present invention. Multiple processes 61a, 61b and 61c of a firewall are loaded into processors 51a, 51b, and 51c respectively. Each firewall process 61 performs the function of firewall node 13 in system 10. Each firewall process 61 includes its own data set, works independently and enforces the same security policy. Processor 51d is programmed as a dispatcher 63 which distributes packets between the firewalls. Dispatcher 63 writes packet data into specific addresses of shared memory 53 in order to distribute the packet data to each process 61. Similarly, each process 61 when opening packet data places in shared memory 53 control information regarding load balancing of expected connections or sessions. Control messages from dispatcher 63 similarly synchronize information between processes 61.

Figure 7:
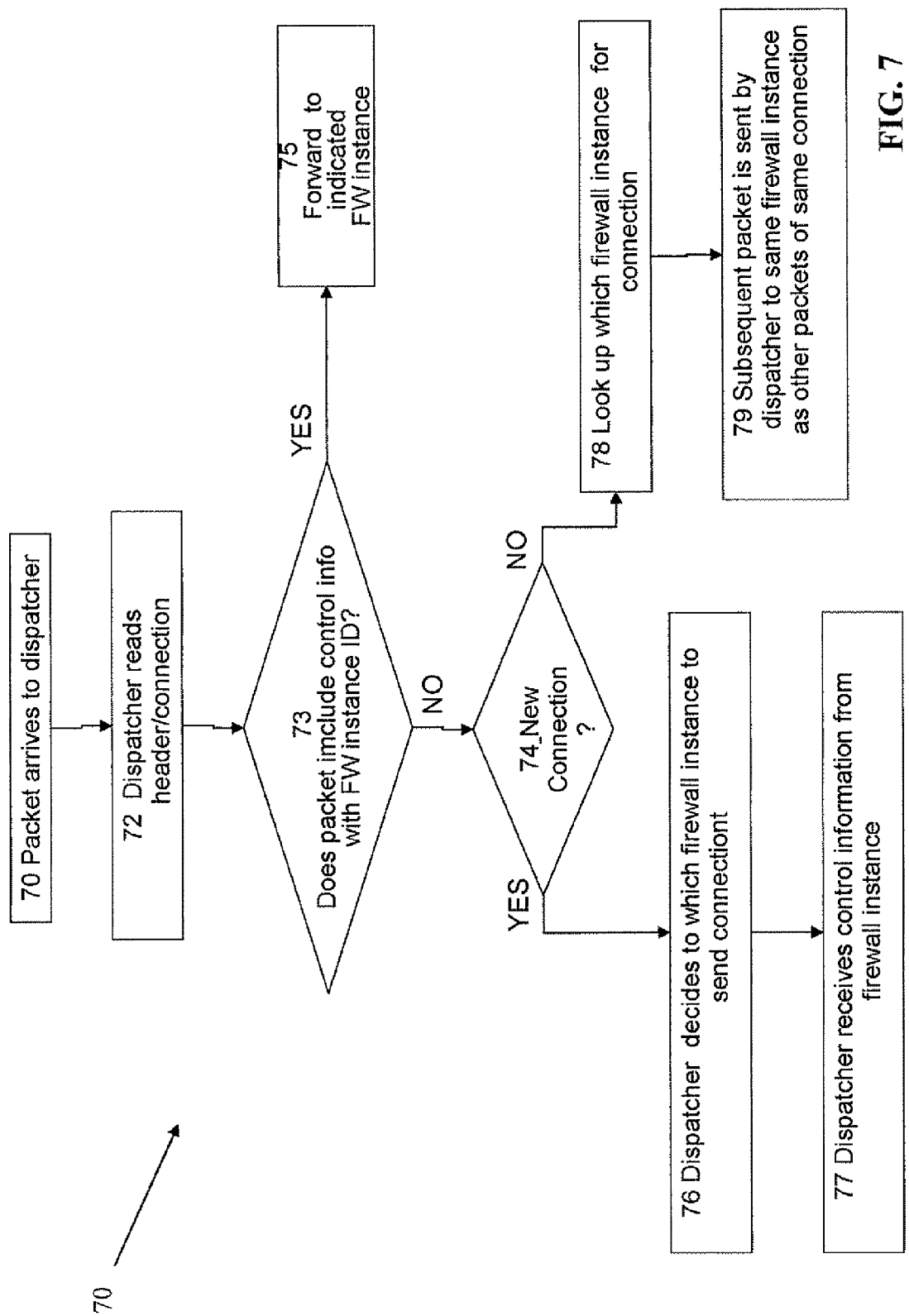
FIG. 7 is a flow chart of a process, according to an embodiment of the present invention using the multiple processor device of FIG. 6.

Reference is now made to FIG. 7, a flow chart 70 according to an embodiment of the present invention. In step 70, a packet arrives at dispatcher 63 and in step 72, dispatcher 63 reads header and/or connection of the packet. If the packet contains control information indicating that the connection is being handled by one of firewall processes 61, (decision block 73) then the packet is forwarded (step 75) to the indicated firewall process based on the firewall process identifier in the control information. Otherwise, if the packet is of a new connection (decision block 74) then dispatcher 63 decides which firewall process 61 based for process on a hash value of the header fields and places the packet in the queue of the appropriate firewall process by transferring data of the packet to the appropriate address in shared memory 53. In step 77, dispatcher 63 receives from firewall process 61 control information based on the received connection. Control information may specify another expected connection of the same session which is preferably handled by the same firewall process 61. If the packet is of an existing connection (decision block 74) then dispatcher 63 looks up (step 78) in a look up table which firewall process 61 is handling the connection. Subsequent packets are sent (step 79) by dispatcher 63 to the same firewall process 63. Firewall process 61 accesses its queue by accessing shared memory 53 and performs firewall security processing of the packets. Multiple processor device 60 is preferably accessed from a network interface to dispatcher 63 using data/control channel mediated by the operating system, e.g. LINUX. The existence of multiple firewall processes 61 is preferably not known to the outside world and multiple processor device 60 appears as a regular VPN gateway both to networks 15 and 17 and to network management.

Figure 8:
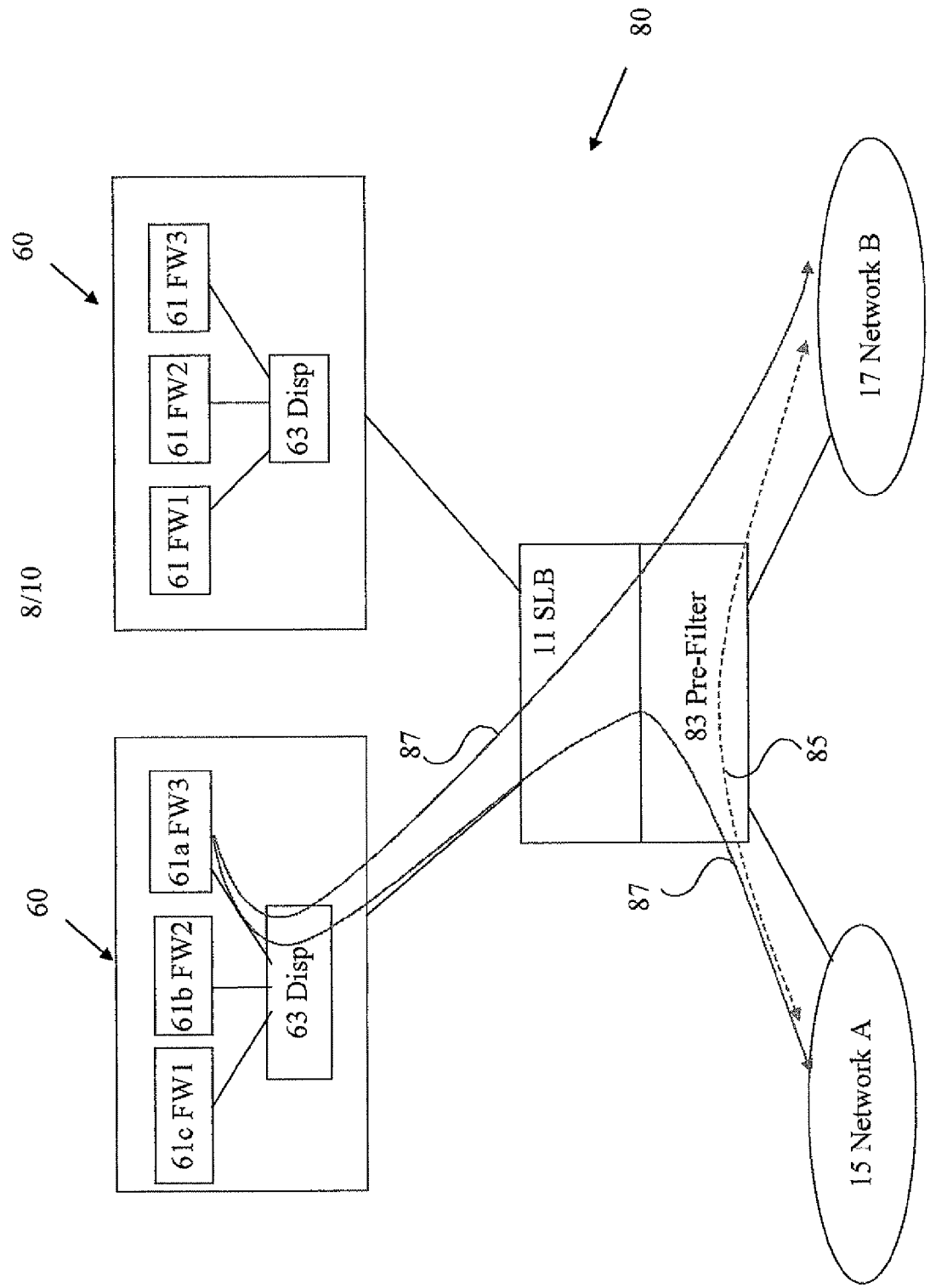
FIG. 8 is a simplified schematic drawing of a hybrid system combining different embodiments of the present invention.

Hybrid Smart Load Balancing Device with Pre-Filtering Module Using Multiple Processor Devices Reference is now made to FIG. 8, illustrating a hybrid smart load balancing system 80, according to an embodiment of the present invention. Hybrid system 80 includes load balancer 11 connected to two multiple-processor devices 60, each with multiple, e.g. three firewall processes 61 and dispatcher 63. One multiple-processor device 60 is shown with firewall processes 61a, 61b and 61c. Dispatcher 63 receives a new connection and dispatches the new connection to one of firewall processes 61 either based on a calculation, e.g. hash of connection parameters or otherwise based on more detailed load information. Dispatcher 63 typically uploads control information to load balancer 11 including a connection identifier and firewall process 61 handling the connection. Load balancer 11 preferably includes a prefilter module 83. Prefilter module 83 opens connections and if a connection is already allowed, e.g. by firewall process 61a, either transfers (step 85) the allowed connection directly to its destination in internal network 17 or in step 87 to firewall process 61a handling the connection based on the control information already received from dispatcher 63. Thus, a dispatching to firewall processes 61 in multiple firewall nodes 13 is offloaded in part or in full to load balancer 11 at least for existing connections.

Command Protocol of Load Balancing Using Multiple Processor Devices

The command protocol in multiple processor devices 60 between dispatcher 63 and firewall processes 61 are similar to the command protocol discuss above between load balancer 11 and firewall nodes 13. Since in multiple processor devices 60 execution is guaranteed by the software program there is no need for nor is there an equivalent to an acknowledgment, e.g ACK. signal. Commands which otherwise operate similarly in multiple processor devices 60 as between load balancer 11 and firewall nodes 13 include: register firewall process 61, and deregister firewall process 61. New connection command is almost the same in multiple processor devices 60 as between load balancer 11 and firewall nodes 13 except that there is no need for an expiration timeout. Other commands including query connection, register multicast, new template, connection dropped and heartbeat are not required or not relevant in in multiple processor devices 60 between dispatcher 63 and firewall processes 61. Additional commands in multiple processor devices 60 optionally include a new-expected connection command and a delete-expected-connection command forwarded by firewall process 61 to dispatcher 63 when a new connection is expected or when an expected connection is deleted. In multiple processor devices 60, a packet forwarding command is used to forward one or more packets, typically through shared memory 53 from dispatcher 63 to firewall process 61 or from firewall process 61 to dispatcher 63.

Figure 9:
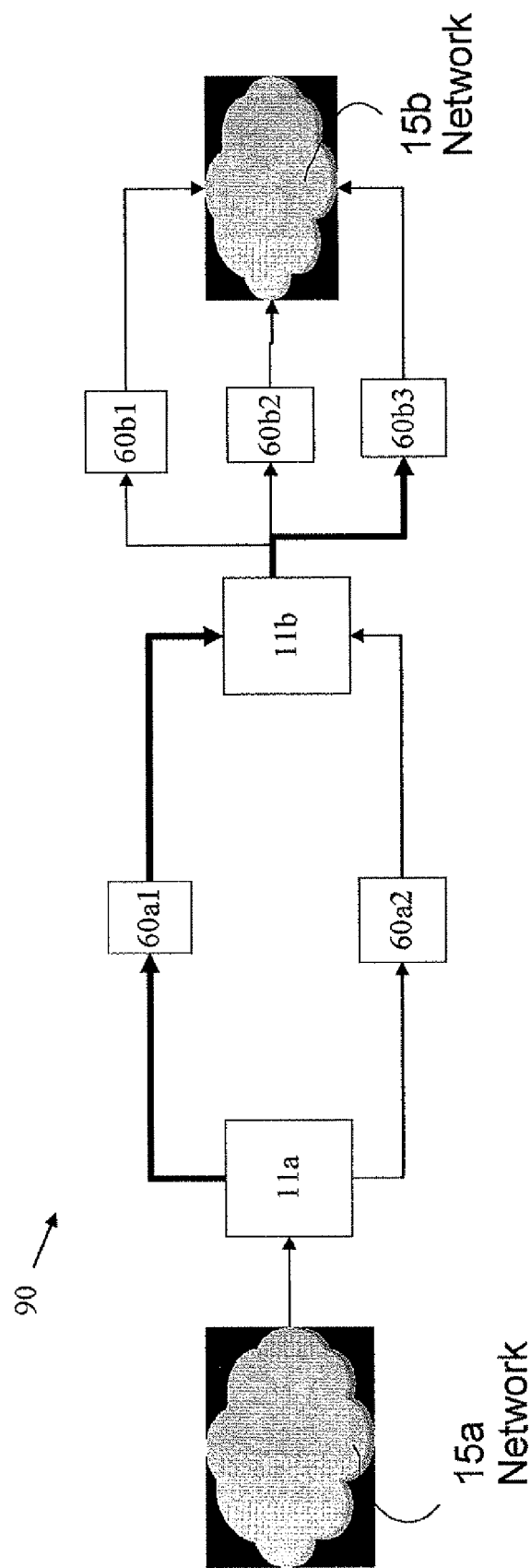
FIG. 9 is a simplified system drawing of a layered security architecture, according to embodiments of the present invention.

General Architecture of Multiple Layers of Dispatching and Security Components Reference is now made to FIG. 9 illustrating by way of example a general architecture 90 which includes multiple layers of dispatching and security components e.g. multiple processor devices 60, according to embodiments of the present invention. Multilayer architecture 90 includes load balancers 11a and 11b and two layers of multiple processor devices 60. The first layer is labeled 60a and the second layer is labeled 60b. A flow of the packets going through different layers, e.g. layers a and b of dispatching-security component 60 is defined and specified for process in load balancer 11a. As an example shown in FIG. 9 (arrows with thicker lines), data flow for a particular session is specified in load balancer 11a to flow through dispatching-security component 60a1 and 60b3. Not shown in FIG. 9 are firewall processes 61 internal to dispatching-security components 60 to which the flow is also defined as in architecture 80. In architecture 90, there is also possibility for caching the flow in such a way that when the packet gets to dispatcher 63 for process in 61a, the dispatcher can extract the correct security component that should handle and forward directly to the correct process 61 of the next dispatching-security component in this case dispatching-security component 60b3. Templates of such flows allow similar sessions to cache the flow.

Figure 10:
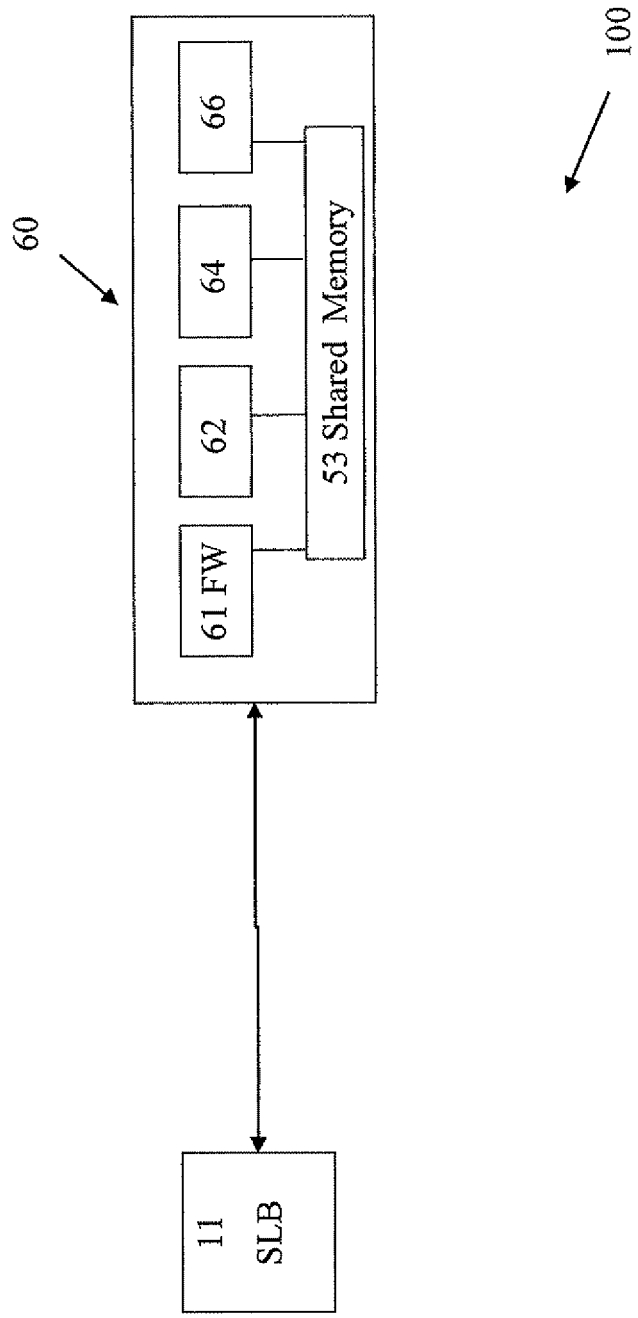
FIG. 10 is a simplified drawing of a system including a multiple processor device programmed according to an embodiment of the present invention.

Distribution of Load Between Processors of a Multiple Processor Device with the Processors Having Different Security Functionality Reference is now made to FIG. 10, a simplified schematic diagram of a system 100 according to an embodiment of the present invention. System 100 includes SLB 11 which distributes load among multiple processors in a multiple processor device 60. However, each processor in system 100 is not necessarily programmed with an identical security function. By way of example only, processor 61 is programmed with a firewall, whereas processor 62 is programmed with an encryption application, processor 64 is programmed with an anti-virus application and processor 66 is programmed with an anti-spam application. Dispatching or distribution of load between the different processors 61, 62, 64, and 66 is performed solely by SLB 11. As a simple example, SLB 11 passes a connection to processor 61 running a firewall application. Upon opening the connection and applying the firewall policy, processor 61 passes control information to SLB 11 to pass one or more data packets of the connection to another processor, for example processor 64, for anti-virus filtering. Alternatively one or more of processors 61, 62, 64, and 66 are programmed to have at least in part dispatching functionality so that connections may be passed through shared memory to be processed for different security functions.

While the invention has been described with respect to a limited number of embodiments, it will be appreciated that many variations, modifications and other applications of the invention may be made.

What is claimed is:

1. A non-transitory computer readable storage medium tangibly embodying a plurality of instructions for programming a multiple processor device, as a load balancing cluster, wherein a plurality of processors are operatively connected, the plurality of instructions comprising:
    (a) instructions for programming the plurality of the processors respectively with a plurality of respective security applications, each said security application performing a distinct respective security function selected from the group consisting of: inspection, network address translation, encryption, filtering, intrusion detection, intrusion prevention, threat management, anti-spam, and anti-virus; wherein each of the processors is a member of the load balancing cluster that is disposed between an internal network and an external network and wherein each of the processors is part of the multiple processor device;
    (b) instructions for transferring a data stream of a first connection to one of said security applications;
    (c) instructions for transmitting, by said one security application, control information that includes at least one expected connection identifier provided by performing a network address translation on said first connection, wherein said at least one expected connection identifier identifies an expected connection that has a different operational purpose in said networks than said first connection and wherein said at least one expected connection identifier differs from an identifier of said first connection; and
    (d) instructions for balancing load based on said control information, wherein the balancing includes transferring subsequent data streams, having the same identifier as said at least one expected connection identifier, to a different said security application.

2. The non-transitory computer readable storage medium of claim 1, wherein at least one of said data streams includes at least one data packet of a data connection, and wherein said control information specifies transferring said at least one data packet from one of said processors to another of said processors.

3. A system for protecting data communications, the system comprising:
    (a) a cluster of security network components, disposed between an internal network and an external network; and
    (b) at least one load balancer, disposed between said internal network and said external network, which operatively connects said security network components by transferring a plurality of data streams respectively to said security network components wherein said at least one load balancer receives a command from at least one of said security network components, wherein said command specifies balancing network component load of said data streams between said security network components; wherein at least one said security network components comprises: a multiple processor device including a plurality of processors operatively connected by a transport mechanism for sharing data, wherein at least one of the processors is programmed as a dispatcher and a plurality of the processors is programmed with respective processes, wherein each of said processes performs a distinct respective security function selected from the group consisting of: inspection, network address translation, encryption, filtering, intrusion detection, intrusion prevention, threat management, anti-spam, and anti-virus, wherein said dispatcher is configured to transfer a data stream of a first connection to one of said processes through the transport mechanism; wherein control information is transmitted through the transport mechanism from said one process to said dispatcher, wherein said control information specifies at least one expected connection identifier, provided by performing a network address translation on said first connection, wherein said expected connection identifier identifies an expected connection that has a different operational purpose in said networks than said first connection, wherein said expected connection identifier differs from an identifier of said first connection; and said dispatcher balances said process load based on said control information, by transferring subsequent data streams having the same identifier as said at least one expected connection identifier, to a different said process.

4. The system, according to claim 3, wherein said command is transmitted to said at least one load balancer from selectably either said dispatcher or one of said processes.

5. The system, according to claim 3, wherein said command includes said control information based on at least one datum received by said dispatcher from at least one of said processes.

6. The system, according to claim 3, wherein said at least one load balancer includes a pre-filter module, wherein based on said command, said pre-filter module addresses at least one packet of at least one of said data streams to a single process.

7. The system, according to claim 3, wherein said at least one load balancer includes a pre-filter module, wherein based on said command, said pre-filter module addresses at least one packet of at least one of said data streams to a destination in the network.

8. The system, according to claim 3, wherein the data communications include a plurality of sessions wherein connection information is included as arguments of control commands of the sessions, wherein a protocol configures said security network components and said at least one load balancer so that
   (i) said network components read said connection information; and
   (ii) commands from the security network components to said at least one load balancer allow maintaining connection stickiness in said sessions, wherein connection stickiness guarantees that all packets of each of said sessions are processed by a single process.

9. The system of claim 3, wherein said at least one load-balancer is separate from said security network components and wherein said dispatcher is separate from said processes.

10. The system of claim 3, wherein at least one of said data streams includes at least one data packet of a data connection, and wherein said control information specifies transferring said at least one data packet from one of said processors to another of said processors.

11. A method for protecting data communications using a multiple processor device wherein a plurality of processors are operatively connected, the multiple processor device being disposed between an internal network and an external network, the method comprising the steps of:
   (a) programming a plurality of the processors respectively with a plurality of security applications, with at least two of said security applications performing distinct respective security functions selected from the group consisting of: inspection, network address translation, encryption, filtering, intrusion detection, intrusion prevention, threat management, anti-spam, and anti-virus;
   (b) transferring a data stream of a first connection to one of said security applications;
   (c) transmitting, by said one security application, control information that includes at least one expected connection identifier, provided by performing a network address translation on said first connection, wherein said expected connection identifier identifies an expected connection that has a different operational purpose in the networks than said first connection, wherein said expected connection identifier differs from an identifier of said first connection, wherein said control information specifies distributing load of said data stream between said security applications; and
   (d) distributing load based on said control information, wherein the distributing includes transferring subsequent data streams, having the same identifier as said at least one expected connection identifier, to a different said security application.

12. The method of claim 11, wherein at least one of said data streams includes at least one data packet of a data connection, and wherein said control information specifies transferring said at least one data packet from one of said processors to another of said processors.

13. A multiple-processor device wherein a plurality of processors are operatively connected, the multiple-processor device for being disposed between an internal network and an external network, the multiple-processor device comprising: the processors respectively programmed with a plurality of different security applications, each said security application performing a distinct respective security function selected from the group consisting of: inspection, network address translation, encryption, filtering, intrusion detection, intrusion prevention, threat management anti-spam and anti-virus; wherein a data stream of a first connection is transferred to one of said security applications, wherein at least one expected connection identifier, that is provided by performing a network address translation on said first connection, that identifies an expected connection that has a different operational purpose in the networks than said first connection, and that is different from an identifier of said first connection, is read from a packet payload of said data stream and control information that includes said at least one expected connection identifier is transmitted from said one security application, wherein said control information specifies distributing load of said data streams between said security applications; and said load is distributed based on said control information, by transferring subsequent data streams, having the same identifier as said at least one expected connection identifier, to said one security application.

14. The multiple-processor device of claim 13, wherein at least one of said data streams includes at least one data packet of a data connection, and wherein said control information specifies transferring said at least one data packet from one of said processors to another of said processors.

15. A non-transitory computer readable storage medium tangibly embodying a plurality of instructions for programming a multiple processor device, as a load balancing cluster, wherein a plurality of processors are operatively connected, that is disposed between an internal network and an external network, the plurality of instructions comprising:
   (a) instructions for programming the processors respectively with a plurality of different security applications, each said security application performing a distinct respective security function selected from the group consisting of: inspection, network address translation, encryption, filtering, intrusion detection, intrusion prevention, threat management, anti-spam, and anti-virus;
   (b) instructions for transferring a data stream of a first connection to one of said security applications;
   (c) instructions for transmitting, by said one security application, control information that includes at least one expected connection identifier, provided by performing a network address translation on said first connection, wherein said expected connection identifier identifies an expected connection that has a different operational purpose in the networks than said first connection, wherein said expected connection identifier differs from an identifier of said first connection, wherein said control information specifies distributing load of said data streams between said security applications; and
   (d) instructions for distributing load based on said control information, wherein the distributing includes transferring subsequent data streams, having the same identifier as said at least one expected connection identifier, to a different said security application.

16. The non-transitory computer readable storage medium of claim 15, wherein at least one of said data streams includes at least one data packet of a data connection, and wherein said control information specifies transferring said at least one data packet from one of said processors to another of said processors.

* * * * *